US012694473B2

(12) United States Patent
Han et al.

(10) Patent No.: US 12,694,473 B2
(45) Date of Patent: Jul. 28, 2026

(54) ELECTRONIC DEVICE AND METHOD WITH IMAGE PROCESSING

(71) Applicant: SAMSUNG ELECTRONICS CO., LTD., Suwon-si (KR)

(72) Inventors: Seungju Han, Suwon-si (KR); Hui Li, Xi'an (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 18/497,077

(22) Filed: Oct. 30, 2023

(65) Prior Publication Data

US 2024/0161237 A1     May 16, 2024

(30) Foreign Application Priority Data

Nov. 14, 2022    (CN) .......................... 202211424777.1
Aug. 31, 2023    (KR) .......................... 10-2023-0115612

(51) Int. Cl.
*G06T 3/4053*     (2024.01)
*G06T 3/4046*     (2024.01)
*G06V 10/77*      (2022.01)
*G06V 10/80*      (2022.01)
(Continued)

(52) U.S. Cl.
CPC .......... *G06T 3/4053* (2013.01); *G06T 3/4046* (2013.01); *G06V 10/7715* (2022.01); *G06V 10/806* (2022.01); *G06V 10/82* (2022.01); *G06V 40/168* (2022.01)

(58) Field of Classification Search
None
See application file for complete search history.

(56) References Cited

U.S. PATENT DOCUMENTS 10,904,476 B1     1/2021   Siagian et al.
11,189,013 B2     11/2021  Micheini et al.
(Continued)

FOREIGN PATENT DOCUMENTS

CN     107154023 A     9/2017
CN     105960657 B     8/2019
(Continued)

OTHER PUBLICATIONS

Gan, Yuan, et al. "VidFace: A Full-Transformer Solver for Video Face Hallucination with Unaligned Tiny Snapshots." arXiv preprint arXiv:2105.14954, 2021, (11 pages). (Year: 2021).*
(Continued)

*Primary Examiner* — Anand P Bhatnagar
(74) *Attorney, Agent, or Firm* — NSIP Law

(57) ABSTRACT
An electronic device and a processor-implemented method with image processing are provided. The processor-implemented method comprises generating an initial image feature matrix of a face image based on a multi-level feature map of the face image; generating an initial face priori feature matrix of the face image based on a final level feature map of the multi-level feature map; and generating a super-resolution image of the face image and/or key point coordinates of the face image by using one or more encoders, based on the initial image feature matrix and the initial face priori feature matrix, wherein, when the one or more encoders are plural encoders, they are cascaded.

20 Claims, 7 Drawing Sheets

(51) Int. Cl.
    *G06V 10/82*        (2022.01)
    *G06V 40/16*        (2022.01)

(56)            References Cited

U.S. PATENT DOCUMENTS

| | | | | |
|---|---|---|---|---|
| 11,683,525 | B2 * | 6/2023 | Mammou | G06T 9/001 |
| | | | | 375/240.12 |
| 12,094,179 | B2 * | 9/2024 | Tourapis | G06T 9/001 |
| 12,198,389 | B2 * | 1/2025 | Mammou | G06T 7/162 |
| 12,401,822 | B2 * | 8/2025 | Kim | H04N 19/17 |
| 12,439,083 | B2 * | 10/2025 | Tourapis | H04N 19/467 |
| 12,450,831 | B2 * | 10/2025 | Sun | G06F 3/14 |
| 2023/0232044 | A1 * | 7/2023 | Kim | H04N 19/17 |
| | | | | 375/240.12 |
| 2023/0401751 | A1 * | 12/2023 | Mammou | G06T 9/00 |
| 2024/0233196 | A9 * | 7/2024 | Akhtar | G06T 9/002 |
| 2025/0054197 | A1 * | 2/2025 | Tourapis | G06T 9/001 |
| 2025/0325347 | A1 * | 10/2025 | Jang | G16H 40/67 |
| 2025/0328622 | A1 * | 10/2025 | Lal | G06F 21/36 |

FOREIGN PATENT DOCUMENTS

| | | |
|---|---|---|
| KR | 10-2083166 B1 | 3/2020 |
| KR | 10-2022-0008135 A | 1/2022 |

OTHER PUBLICATIONS

Gan, Yuan, et al. "VidFace: A Full-Transformer Solver for Video Face Hallucination with Unaligned Tiny Snapshots." arXiv preprint arXiv:2105.14954, 2021, (11 pages).

Yuan, Li, et al. "Tokens-to-Token ViT: Training Vision Transformers from Scratch on ImageNet." Proceedings of the IEEE/CVF international conference on computer vision. 2021., (10 pages).

Li, Hui, et al. "Towards Accurate Facial Landmark Detection Via Cascaded Transformers." Proceedings of the IEEE/CVF Conference on Computer Vision and Pattern Recognition. 2022., (10 pages).

Extended European search report issued on Mar. 4, 2024, in counterpart European Patent Application No. 23209761.8 (9 pages).

* cited by examiner

ELECTRONIC DEVICE AND METHOD WITH IMAGE PROCESSING

CROSS-REFERENCE TO RELATED APPLICATIONS

This application claims the benefit under 35 USC § 119(a) of Chinese Patent Application No. 202211424777.1 filed on Nov. 14, 2022, in the China National Intellectual Property Administration, and Korean Patent Application No. 10-2023-0115612 filed on Aug. 31, 2023, in the Korean Intellectual Property Office, the entire disclosures of which are incorporated herein by reference for all purposes.

BACKGROUND

1. Field

The following description relates to an electronic device and method with image processing.

2. Description of Related Art

Recently, the development of a deep neural network has led to the significant development of a face super resolution (FSR) technology. FSR is typically performed by a convolutional neural network (CNN), a generative adversarial network (GAN), an ensemble learning, or a reinforcement learning network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes generating an initial image feature matrix of a face image based on a multi-level feature map of the face image; generating an initial face priori feature matrix of the face image based on a final level feature map of the multi-level feature map; and generating a super-resolution image of the face image and/or key point coordinates of the face image by using one or more encoders, based on the initial image feature matrix and the initial face priori feature matrix, wherein, when the one or more encoders are plural encoders, they are cascaded.

In the method, each of the one or more encoders may include a cross-attention model and a first transformable attention model, wherein the super-resolution image is obtained, and the obtaining of the super-resolution image may include obtaining a fused image feature matrix, based on the initial image feature matrix and the initial face priori feature matrix, by using the cross-attention model of an initial encoder of the one or more encoders; obtaining an updated image feature matrix of the face image, based on the fused image feature matrix, by using the first transformable attention model of the initial encoder; and obtaining the super-resolution image of the face image, based on the face image and the updated image feature matrix.

In the method, each of the one or more encoders may include a cross-attention model and a second transformable attention model, and wherein the key point coordinates are obtained, and the obtaining of the key point coordinates of the face image may include obtaining a fused image feature matrix, based on the initial image feature matrix and the initial face priori feature matrix, by using the cross-attention model of an initial encoder of the one or more encoders; obtaining an updated face priori feature of the face image, based on the fused image feature matrix and the initial face priori feature matrix, by using the second transformable attention model of the initial encoder; and predicting the key point coordinates of the face image, based on the updated face priori feature and initial key point coordinates of the face image, wherein the initial key point coordinates of the face image are obtained based on the initial face priori feature matrix.

In the method, the one or more encoders each may include a first network, a second network, and a third network, wherein the first network comprises a cross-attention model, the second network comprises a first transformable attention model, and the third network comprises a second transformable attention model, and the obtaining of the super-resolution image of the face image and/or the key point coordinates of the face image may include, when the obtaining of the super-resolution image is performed, obtaining a fused image feature matrix of a current encoder by using the first network, based on an image feature matrix corresponding to the current encoder and a face priori feature matrix corresponding to the current encoder, for each of the one or more encoders, obtaining an updated face priori feature matrix of the current encoder by using the second network, based on the fused image feature matrix of the current encoder and the face priori feature matrix corresponding to the current encoder, for each of plural encoders when the one or more encoders include the plural encoders, or the plural encoders and an additional encoder, obtaining an updated image feature matrix of the current encoder by using the third network, based on the fused image feature matrix of the current encoder, for each of the one or more encoders, and obtaining the super-resolution face image based on the face image and an updated image feature matrix of a final encoder among the one or more encoders; and when the obtaining of the key point coordinates is performed, predicting the key point coordinates of the face image, based on an updated face priori feature matrix of the final encoder and initial key point coordinates of the face image, wherein the initial key point coordinates of the face image are obtained based on the initial face priori feature matrix, wherein, when the current encoder is an initial encoder among the one or more encoders, the image feature matrix corresponding to the current encoder is the initial image feature matrix, and the face priori feature matrix corresponding to the current encoder is the initial face priori feature matrix, and, wherein, when the current encoder is not the initial encoder, the image feature matrix corresponding to the current encoder is an updated image feature matrix of a previous encoder of the current encoder, and the face priori feature matrix corresponding to the current encoder is an updated face priori feature matrix of the previous encoder of the current encoder.

The obtaining of the super-resolution image of the face image and/or the key point coordinates of the face image may include, based on an updated image feature matrix corresponding to the final encoder, obtaining a first offset by using an up-sampling amplification network and obtaining the super-resolution image based on the face image and the first offset; and/or based on an updated face priori feature matrix corresponding to the final encoder, obtaining a second offset by using a key point prediction network and obtaining the key point coordinates of the face image predicted based on the initial key point coordinates of the face image and the second offset.

The first network of each of the one or more encoders may include a layer normalization model and a feedforward network model, and the obtaining of the fused image feature matrix of the current encoder may include obtaining the fused image feature matrix of the current encoder through a cascaded cross-attention model, the layer normalization model, and the feedforward network model by inputting the image feature matrix corresponding to the current encoder in which position information is embedded, the face priori feature matrix corresponding to the current encoder in which the position information is embedded, and the face priori feature matrix corresponding to the current encoder respectively as a query vector, a key vector, and a value vector to a cross-attention model.

The obtaining of the updated image feature matrix of the current encoder by using the third network, based on the fused image feature matrix of the current encoder, may include determining a normalization position of each feature of the fused image feature matrix of the current encoder, wherein the normalization position is a normalization position of a feature in a feature map corresponding to each feature in the feature map; determining K normalization positions near the normalization position of each feature according to a preset rule in each feature map of the multi-level feature map; and obtaining a feature corresponding to each feature of the fused image feature matrix of the current encoder as a feature of the updated image feature matrix of the current encoder by performing weighted summation on L*K features corresponding to the K normalization positions of each feature map of the multi-level feature map in the fused image feature matrix of the current encoder.

The second network of each of the one or more encoders may further include a self-attention model, and the obtaining of the updated face priori feature matrix of the current encoder may include obtaining a self-attention face priori feature matrix corresponding to the current encoder by using the self-attention model, based on the face priori feature matrix corresponding to the current encoder; and obtaining the updated face priori feature matrix of the current encoder by using the first transformable attention model, based on the self-attention face priori feature matrix corresponding to the current encoder and the fused image feature matrix of the current encoder.

The self-attention model may include a self-attention layer that is cascaded, a layer normalization layer, and a feedforward network layer, and the obtaining of the self-attention face priori feature matrix of the current encoder may include obtaining the self-attention face priori feature matrix of the current encoder through the self-attention layer, the layer normalization layer, and the feedforward network layer by inputting the face priori feature matrix corresponding to the current encoder in which the position information is embedded, the face priori feature matrix corresponding to the current encoder in which the position information is embedded, and the face priori feature matrix corresponding to the current encoder respectively as a query vector, a key vector, and a value vector to the self-attention model, wherein the obtaining of the updated face priori feature matrix of the current encoder by using the second transformable attention model may include determining a normalization position of each position of the self-attention face priori feature matrix of the current encoder in the final level feature map, wherein the normalization position is a normalization position of a feature in a final level feature map corresponding to each feature in the final level feature map; determining K normalization positions near the normalization position in the final level feature map according to a preset rule; and determining K features corresponding to the K normalization positions in the updated image feature matrix of the current encoder and obtaining a feature corresponding to each feature of the self-attention face priori feature matrix as a feature of the updated face priori feature matrix of the current encoder by performing weighted summation on the K features.

In an example, a non-transitory computer-readable storage medium storing instructions that, when executed by one or more processors, cause the one or more processors to perform the method above.

In another general aspect, an electronic device includes one or more processors; and a memory configured to store instructions, wherein, when the instructions are executed by the one or more processors, the one or more processors are configured to generate an initial image feature matrix of a face image based on a multi-level feature map of the face image; generate an initial face priori feature matrix of the face image based on a final level feature map of the multi-level feature map; and generate a super-resolution image of the face image and/or key point coordinates of the face image, by using one or more encoders, based on the initial image feature matrix and the initial face priori feature matrix, wherein, when the one or more encoders are plural encoders, they are cascaded.

In the electronic device, each of the one or more encoders may include a cross-attention model and a first transformable attention model, wherein the super-resolution image is obtained, and the one or more processors may be further configured to obtain a fused image feature matrix, based on the initial image feature matrix and the initial face priori feature matrix, by using the cross-attention model of an initial encoder of the one or more encoders; obtain an updated image feature matrix of the face image, based on the fused image feature matrix, by using the first transformable attention model of the initial encoder; and obtain the super-resolution image of the face image, based on the face image and the updated image feature matrix.

In the electronic device, each of the one or more encoders may include a cross-attention model and a second transformable attention model, wherein the key point coordinates are obtained, and the one or more processors may be further configured to obtain a fused image feature matrix, based on the initial image feature matrix and the initial face priori feature matrix, by using the cross-attention model of an initial encoder of the one or more encoders; obtain an updated face priori feature of the face image, based on the fused image feature matrix and the initial face priori feature matrix, by using the second transformable attention model of the initial encoder; and predict the key point coordinates of the face image, based on the updated face priori feature and initial key point coordinates of the face image, wherein the initial key point coordinates of the face image are obtained based on the initial face priori feature matrix.

The one or more encoders may each include a first network, a second network, and a third network, wherein the first network comprises a cross-attention model, the second network comprises a first transformable attention model, and the third network comprises a second transformable attention model, and the one or more processors may be further configured to, when the obtaining of the super-resolution image is performed, obtain a fused image feature matrix of a current encoder by using the first network, based on an image feature matrix corresponding to the current encoder and a face priori feature matrix corresponding to the current encoder, for each of one or more encoders, obtain an updated face priori feature matrix of the current encoder by using the second network, based on the fused image feature matrix of the current encoder and the face priori feature matrix corresponding to the current encoder, for each of plural encoders when the one or more encoders include the plural encoders, or the plural encoders and an additional encoder, obtain an updated image feature matrix of the current encoder by using the third network, based on the fused image feature matrix of the current encoder, for each of the one or more encoders, and obtain the super-resolution face image based on the face image and an updated image feature matrix of a final encoder among the one or more encoders; and when the obtaining of the skey point coordinates is performed, predict the key point coordinates of the face image, based on an updated face priori feature matrix of the final encoder and initial key point coordinates of the face image, wherein the initial key point coordinates of the face image are obtained based on the initial face priori feature matrix, wherein, when the current encoder is an initial encoder among the one or more encoders, the image feature matrix corresponding to the current encoder is the initial image feature matrix, and the face priori feature matrix corresponding to the current encoder is the initial face priori feature matrix, and, wherein, when the current encoder is not the initial encoder, the image feature matrix corresponding to the current encoder is an updated image feature matrix of a previous encoder of the current encoder, and the face priori feature matrix corresponding to the current encoder is an updated face priori feature matrix of the previous encoder of the current encoder.

The one or more processors may be further configured to, based on an updated image feature matrix corresponding to the final encoder, obtain a first offset by using an up-sampling amplification network and obtaining a super-resolution image based on the face image and the first offset; and/or based on an updated face priori feature matrix corresponding to the final encoder, obtain a second offset by using a key point prediction network and obtaining the key point coordinates of the face image predicted based on the initial key point coordinates of the face image and the second offset.

The first network of each of one or more encoders may further include a layer normalization model and a feedforward network model, and the one or more processors may be further configured to obtain the fused image feature matrix of the current encoder through a cascaded cross-attention model, the layer normalization model, and the feedforward network model by inputting the image feature matrix corresponding to the current encoder in which position information is embedded, the face priori feature matrix corresponding to the current encoder in which the position information is embedded, and the face priori feature matrix corresponding to the current encoder respectively as a query vector, a key vector, and a value vector to a cross-attention model.

The one or more processors may be further configured to determine a normalization position of each feature of the fused image feature matrix of the current encoder, wherein the normalization position is a normalization position of a feature in a feature map corresponding to each feature in the feature map; determine K normalization positions near the normalization position of each feature according to a preset rule in each feature map of the multi-level feature map; and obtain a feature corresponding to each feature of the fused image feature matrix of the current encoder as a feature of the updated image feature matrix of the current encoder by performing weighted summation on L*K features corresponding to the K normalization positions of each feature map of the multi-level feature map in the fused image feature matrix of the current encoder.

The second network of each of the one or more encoders may further include a self-attention model, and the third obtaining model may be further configured to obtain a self-attention face priori feature matrix corresponding to the current encoder by using the self-attention model, based on the face priori feature matrix corresponding to the current encoder; and obtain the updated face priori feature matrix of the current encoder by using the first transformable attention model, based on the self-attention face priori feature matrix corresponding to the current encoder and the fused image feature matrix of the current encoder.

The self-attention model may include a self-attention layer that is cascaded, a layer normalization layer, and a feedforward network layer, and the one or more processors may be further configured to obtain the self-attention face priori feature matrix of the current encoder through the self-attention layer, the layer normalization layer, and the feedforward network layer by inputting the face priori feature matrix corresponding to the current encoder in which the position information is embedded, the face priori feature matrix corresponding to the current encoder in which the position information is embedded, and the face priori feature matrix corresponding to the current encoder respectively as a query vector, a key vector, and a value vector to the self-attention model; determine a normalization position of each position of the self-attention face priori feature matrix of the current encoder in the final level feature map, wherein the normalization position is a normalization position of a feature in a final level feature map corresponding to each feature in the final level feature map; determine K normalization positions near the normalization position in the final level feature map according to a preset rule; and determine K features corresponding to the K normalization positions in the updated image feature matrix of the current encoder and obtaining a feature corresponding to each feature of the self-attention face priori feature matrix as a feature of the updated face priori feature matrix of the current encoder by performing weighted summation on the K features.

Other features and aspects will be apparent from the following detailed description, the drawings, and the claims.

Figure 1:
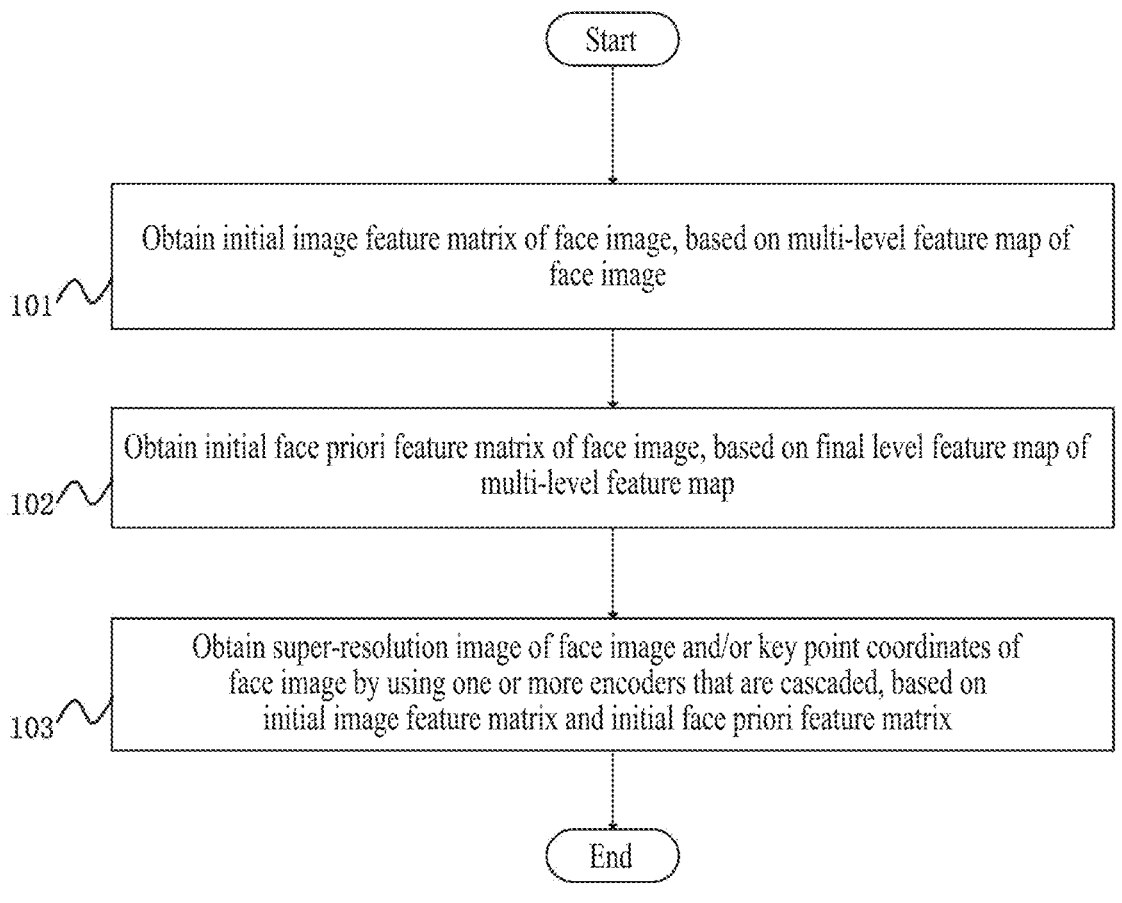
FIG. 1 illustrates an example method of an electronic device with image processing according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., by wire), wirelessly, or via a third component.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

In the face super resolution (FSR) technology, a complex network structure design is typically required to improve the performance of FSR. However, such a complex network structure may lead to an increase in memory size, the amount of computation and parameters, which may also increase the network training time and operation costs. Moreover, the FSR performance may be improved by using face priori information, but an existing FSR method using the face priori information may require the labeling of additional face priori information. In the present disclosure, as a non-limiting example, one or more embodiments may include a method and electronic device with image processing, which is able to aggregate multi-level image features, using an FSR model based on a deformable attention mechanism, to explore facial structure intrinsically and improve super-resolution results, without requesting additional facial prior annotations.

FIG. 1 illustrates an example method with image processing by an electronic device according to one or more embodiments.

In the example method, operations 101 through 103 may be performed sequentially but may not be necessarily performed sequentially. For example, the order of the operations may be changed and at least two of the operations may be performed in parallel. Also, operations 101 through 103 may be performed by at least one component (e.g., a host processor, an accelerator, a memory, etc.) of the electronic device.

The electronic device (e.g., the electronic device 700 of FIG. 7) may be a device for processing an image, and include one or more processors and one or more memories. The one or more processors may be configured to execute instructions and the one or more memories may store the instructions and image data, such that the execution of the instructions by the one or more processors may configure the one or more processors to perform the operations 101 through 103. The non-limiting examples of the electronic device may include a mobile phone, a smartphone, a tablet personal computer (PC), an e-book device, a laptop, a PC, a desktop, a workstation, or a server, various wearable devices, such as a smart watch, smart eyeglasses, a head-mounted display (HMD), or smart clothing, various home appliances such as a smart speaker, a smart television (TV), or a smart refrigerator, and other devices, such as a smart vehicle, a smart kiosk, an Internet of things (IoT) device, a walking assist device (WAD), a drone, or a robot, but examples are not limited to the foregoing examples. The image may include a face, but examples are not limited thereto, and the image may include various objects according to embodiments. In the present disclosure, the electronic device may also be referred to as an image processing device or a face image processing device for ease of description.

In operation 101, the electronic device may capture a face image or receive an input face image captured by, for example, a camera of or associated with the electronic device. The electronic device may be configured to obtain an initial image feature matrix of the face image, based on a multi-level feature map of the face image. For example, the electronic device may obtain the initial image feature matrix of the face image by flattening and cascading the multi-level feature map of the face image.

In operation 102, the electronic device may obtain an initial face priori feature matrix of the face image, based on a final level feature map of the multi-level feature map. For example, the electronic device may obtain the initial face priori feature matrix of the face image by using a fully connected network, based on the final level feature map of the multi-level feature map. Each level feature map in the multi-level feature map may have the same number of channels.

In operation 103, the electronic device may obtain super-resolution image of the face image and/or key point coordinates of the face image, by using one or more encoders that are cascaded in the electronic device, based on the initial image feature matrix and the initial face priori feature matrix. The one or more encoders may be hardware encoders which may be physical devices or components of the electronic device, or processor-readable instruction encoders (or stored encoder models) in the electronic device and implemented by one or more processors for converting data from one format to another.

Hereinafter, some example operations by the electronic device of obtaining the initial image feature matrix and the initial face priori feature matrix are described in detail with reference to FIG. 2.

Figure 2:
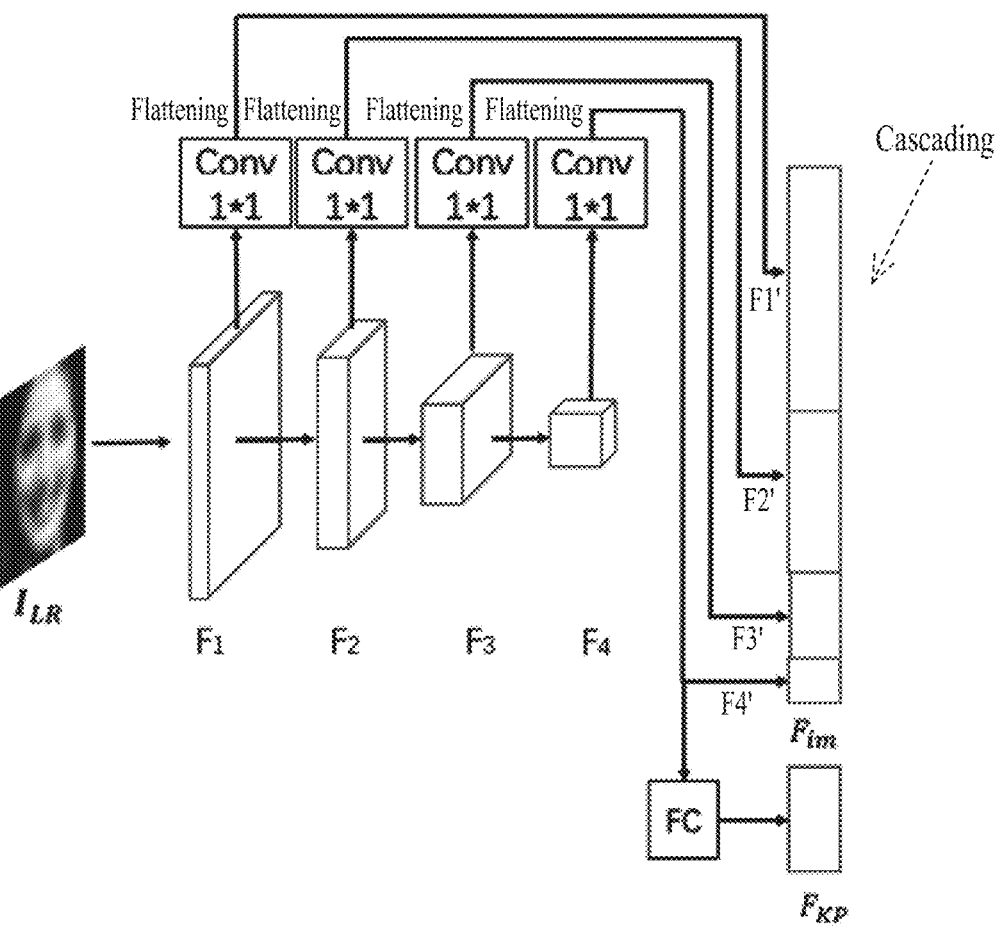
FIG. 2 illustrates example operations of obtaining an initial image feature matrix and an initial face priori feature matrix according to one or more embodiments.

Referring to FIG. 2, an electronic device (e.g., the electronic device 700 of FIG. 7) may extract pyramid feature maps F1, F2, F3, and F4 corresponding to respective four levels of a face image input through a trained convolutional neural network (e.g., ResNet18). The electronic device may obtain feature maps F1', F2', F3', and F4' through projection such that a feature of each feature map may have the same number of channels through a 1*1 convolutional network. The electronic device may obtain an initial image feature matrix $F_{im} \in R^{M \times C}$ of the face image by flattening and cascading the obtained feature maps F1', F2', F3', and F4' of four levels. In this case, $F_{im}$ may be a feature of an ith row and an mth column of an initial image feature matrix, R denotes a set of real numbers representing the matrix $F_{im}$, M may be the number of rows of the initial image feature matrix, and C may be the number of columns of the initial image feature matrix. For example, C may be a channel (e.g., C=256) of the same number. For ease of description, $F_{im}$ may also be referred to as the initial image feature matrix.

In the present disclosure, the face image may also be referred to as a low-resolution (LR) image, and the map may also be referred to as a matrix for ease of description. In addition, an example of extracting a feature map of four levels from the LR image is described hereinafter for ease of description.

For example, a face priori feature matrix $F_{KP} \in R^{N \times C}$ may be obtained through linear projection on a spatial dimension in the feature map F4', and N may be the number of rows of the face priori feature matrix, and C may be the number of columns of the face priori feature matrix.

For example, an initial face priori feature matrix of the LR image may be obtained according to Equation 1 below.

$$F_{KP} = FC(F4') \qquad \text{Equation 1}$$

In Equation 1, FC(·) may be a fully connected operation.

As described above, in operation 103 of FIG. 1, the electronic device may obtain a super-resolution image of the face image and/or key point coordinates of the face image by using one or more encoders that are cascaded, based on the initial image feature matrix and the initial face priori feature matrix.

For example, the operation of obtaining the super-resolution image of the face image may include obtaining a fused image feature matrix, based on an initial image feature matrix (e.g., the initial image feature matrix $F_{im}$) and an initial face priori feature matrix (e.g., the initial face priori feature matrix $F_{KP}$), by using a cross-attention model included in the one or more encoders; obtaining an updated image feature matrix of the face image, based on the fused image feature matrix, by using a first transformable attention model included in the one or more encoders; and obtaining the super-resolution image of the face image, based on the face image and the updated image feature matrix.

In the present disclosure, the model may also be referred to as a layer of a neural network for ease of description. A referred model may also include multiple layers. For example, a cross-attention model may also be referred to as a cross-attention layer, and a layer normalization layer may also be referred to as a normalization model.

For example, the operation of obtaining the key point coordinates of the face image may include obtaining a fused image feature matrix, based on an initial image feature matrix (e.g., the initial image feature matrix $F_{im}$) and an initial face priori feature matrix (e.g., the initial face priori feature matrix $F_{KP}$), by using a cross-attention model included in the one or more encoders; obtaining an updated face priori feature of the face image, based on the fused image feature matrix and the initial face priori feature matrix, by using a second transformable attention model included in the one or more encoders; and predicting the key point coordinates of the face image, based on the updated face priori feature and initial key point coordinates of the face image. In this case, the initial key point coordinates of the face image may be obtained based on the initial face priori feature matrix. For example, the electronic device may perform a full connection on the initial face priori feature matrix to obtain the initial key point coordinates of the face image.

For example, the one or more encoders may each include a first network, a second network, and a third network, in which the first network includes a cross-attention model, the second network includes a first transformable attention model, and the third network includes a second transformable attention model. In this case, the operation of obtaining the super-resolution image of the face image and/or the key point coordinates of the face image may include obtaining a fused image feature matrix of a current encoder by using the first network, based on an image feature matrix corresponding to the current encoder and a face priori feature matrix corresponding to the current encoder for each encoder; obtaining an updated face priori feature matrix of the current encoder by using the second network, based on the fused image feature matrix of the current encoder and the face priori feature matrix corresponding to the current encoder; obtaining an updated image feature matrix of the current encoder by using the third network, based on the fused image feature matrix of the current encoder; obtaining the super-resolution face image based on the face image and an updated image feature matrix of a final encoder among the one or more encoders; and/or predicting the key point coordinates of the face image, based on an updated face priori feature matrix of the final encoder and the initial key point coordinates of the face image. When the current encoder is a first encoder among the one or more encoders, the image feature matrix corresponding to the current encoder may be the initial image feature matrix (e.g., the initial image feature matrix $F_{im}$), and the face priori feature matrix corresponding to the current encoder may be the initial face priori feature matrix (e.g., the initial face priori feature matrix $F_{KP}$). When the current encoder is not the first encoder, the image feature matrix corresponding to the current encoder may be an updated image feature matrix of a previous encoder of the current encoder, and the face priori feature matrix corresponding to the current encoder may be an updated face priori feature matrix of the previous encoder of the current encoder.

For example, the one or more encoders may include a first encoder and a second encoder, but examples are not limited thereto.

Figure 6:
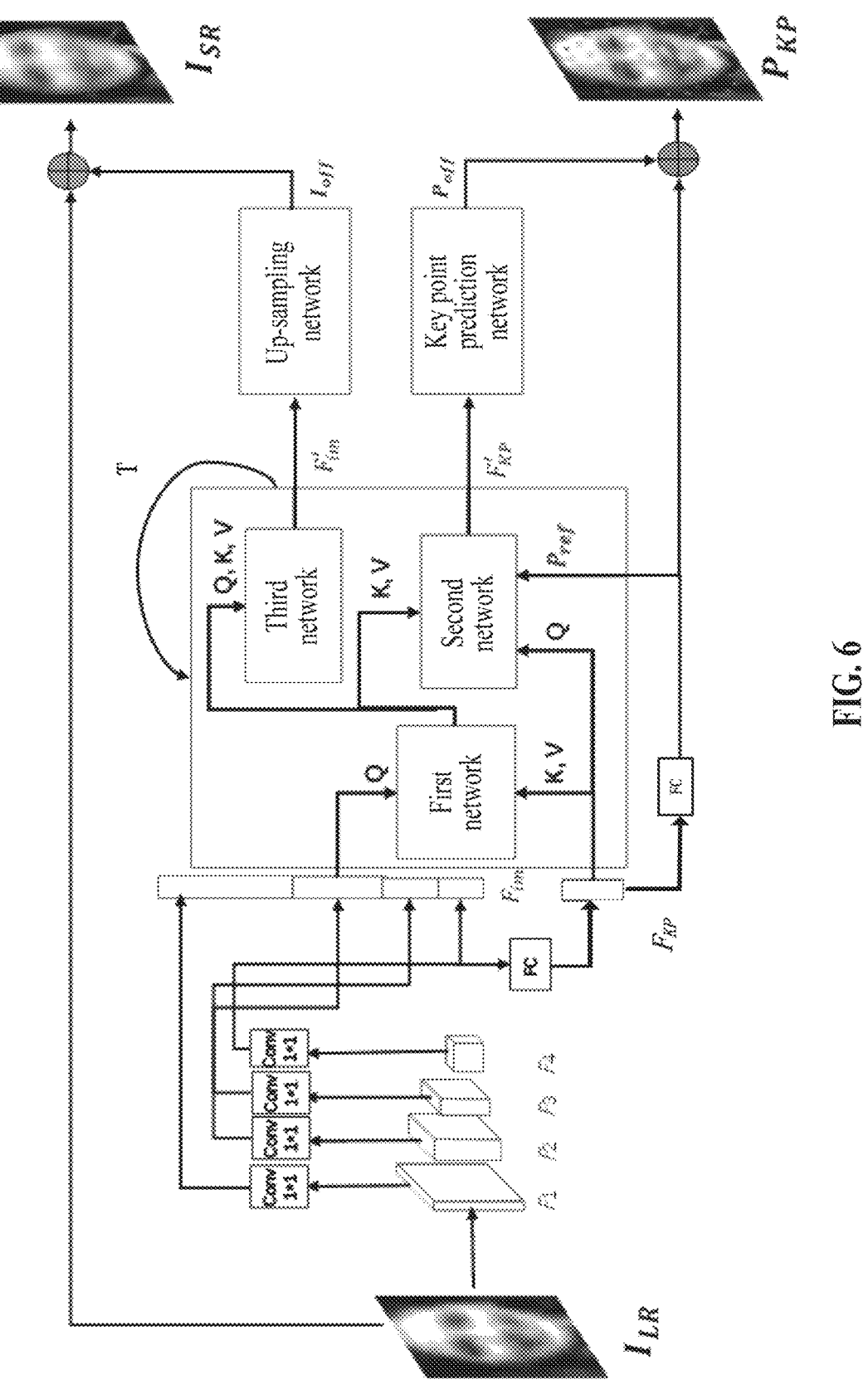
FIG. 6 illustrates example operations of obtaining a super-resolution image of a face image and/or key point coordinates of the face image according to one or more embodiments.

For example, such as illustrated in FIG. 6 and discussed further below, the electronic device may obtain a fused image feature matrix M12 ($M_{network\ \#,encoder\ \#}$, which in this case the 'network #' is the first network, and the 'encoder #' is the first encoder or T=1 in FIG. 6) of the first encoder by using a first network (e.g., a first transformer) of the first encoder, based on an initial image feature matrix M11 (e.g., as the Query of the first transformer) and an initial face priori feature matrix F11 ($F_{first\ network,\ first\ encoder}$, e.g., as the input Key and Value of the first transformer). The electronic device may obtain an updated face priori feature matrix F12 of the first encoder by using a second network (e.g., a second transformer) of the first encoder, based on the initial face priori feature matrix F11 (e.g., as the input Query of the second transformer) and the fused image feature matrix M12 of the first encoder (e.g., as the input Key and Value of the second transformer). The electronic device may obtain an updated image feature matrix M13 of the first encoder by using a third network of the first encoder, based on the fused image feature matrix M12 of the first encoder (e.g., as the input Query, Key, and Value of the third transformer). The electronic device may obtain a fused image feature matrix M22 (e.g., the second encoder, or T=2 in FIG. 6) of the second encoder by using a first network of the second encoder (e.g., the first transformer of the second encoder), based on the updated face priori feature matrix F12 (e.g., as the input Key and Value) of the first encoder and the updated image feature matrix M13 (e.g., as the input Query) of the first encoder. The electronic device may obtain an updated face priori feature matrix F22 of the second encoder by using a second network of the second encoder, based on the fused image feature matrix M22 of the second encoder and the updated face priori feature matrix F12 of the first encoder. The electronic device may obtain an updated image feature matrix M23 of the second encoder by using a third network of the second encoder, based on the fused image feature matrix M22 of the second encoder.

For example, the electronic device may obtain the super-resolution image of the face image, based on the face image and the updated image feature matrix M23 of the second encoder.

For example, the electronic device may predict the key point coordinates of the face image, based on the updated face priori feature matrix F22 of the second encoder and the initial key point coordinates of the face image.

For example, the operation of obtaining the super-resolution image of the face image and/or the key point coordinates of the face image may include, based on an updated image feature matrix corresponding to the final encoder that is cascaded, obtaining a first offset by using an up-sampling amplification network and obtaining a super-resolution image based on the face image and the first offset; and/or, based on an updated face priori feature matrix corresponding to the final encoder that is cascaded, obtaining a second offset by using a key point prediction network and obtaining the key point coordinates of the face image predicted based on the initial key point coordinates of the face image and the second offset. In this case, the key point coordinates of the face image may be obtained by performing a full connection on the initial face priori feature matrix (e.g., the initial face priori feature matrix $F_{KP}$).

For example, the electronic device, based on the updated image feature matrix M23 of the second encoder, may obtain the first offset by using the up-sampling amplification network and may obtain the super-resolution image based on the first offset and the face image. The electronic device, based on the updated face priori feature matrix F22 of the second encoder, may obtain the second offset by using the key point prediction network and may obtain the prediction key point coordinates of the face image, based on the second offset and the initial key point coordinates of the face image. In this case, the initial key point coordinates of the face image may be obtained by performing a full connection on the initial face priori feature matrix (e.g., the initial face priori feature matrix $F_{KP}$).

For example, the first network of each encoder may further include a layer normalization (LN) layer and a feedforward network (FFN) layer. In this case, the operation of obtaining the fused image feature matrix of the current encoder may include obtaining the fused image feature matrix of the current encoder through a cascaded cross-attention model, the layer normalization layer, and the feedforward network layer by inputting the image feature matrix corresponding to the current encoder in which position information is embedded, the face priori feature matrix corresponding to the current encoder in which the position information is embedded, and the face priori feature matrix corresponding to the current encoder respectively as a query vector, a key vector, and a value vector to a cross-attention model.

Figure 3:
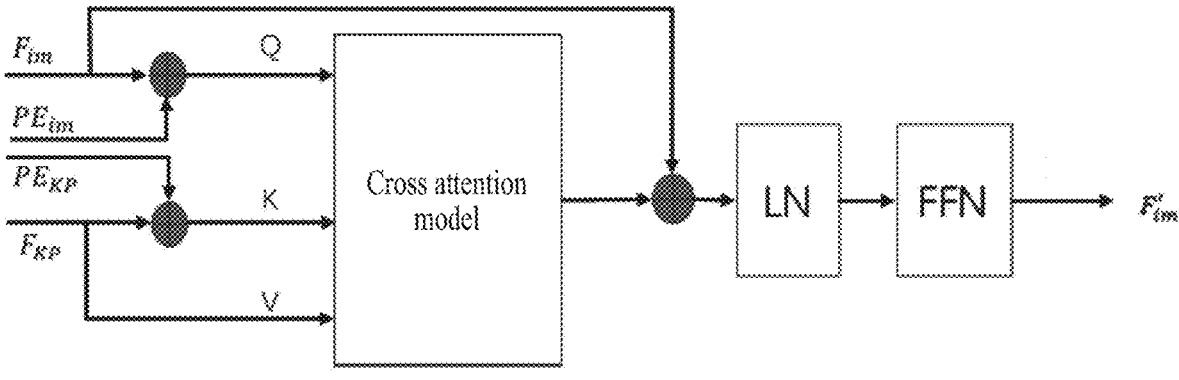
FIG. 3 illustrates an example structure of a first network of one of one or more encoders according to one or more embodiments.

FIG. 3 illustrates an example structure of a first network of one of one or more encoders according to one or more embodiments.

Referring to FIG. 3, the first network may include a cross-attention layer/model, an LN layer, and an FFN layer.

For example, an image feature matrix Q corresponding to a current encoder in which position information is embedded may be obtained according to Equation 2 below.

$$Q = F_{im} + PE_{im} \qquad \text{Equation 2}$$

In Equation 2, $PE_{im}$ may be a feature position of an initial feature map matrix $F_{im}$ in the initial feature map, and $F_{im}$ may be an image feature matrix corresponding to each encoder in which the position information is not embedded.

For example, when $F_{im}$ corresponds to a feature $F_{im\_1}$ of a first-level feature map, $F_{im}$ may be obtained based on $F_{im\_1}$, and $PE_{im}$ may be a position of $F_{im\_1}$ of the first-level feature map.

For example, a key matrix K of an input cross-attention model may be obtained according to Equation 3 below.

$$K = F_{KP} + PE_{KP} \qquad \text{Equation 3}$$

In Equation 3, $PE_{KP}$ may be a position in a final level feature map (that is, a final level feature) of a feature corresponding to a feature map in $F_{KP}$. In this case, $F_{KP}$ may be a face priori feature matrix corresponding to each encoder not including position information. For example, a feature in a final level feature map of a partial feature $F_{KP1}$ of $F_{KP}$ may be $F_{KP0}$, and $PE_{KP}$ may be a position of $F_{KP0}$ in the final level feature map.

In addition, a value matrix of an input cross-attention model may be $F_{KP}$. An output MHCA(Q, K, V) of a cross-attention model may be represented by Equation 4 below.

$$MHCA(Q, K, V) = \text{softmax}\left(\frac{QK^T}{\sqrt{d_k}}\right)V \qquad \text{Equation 4}$$

In Equation 4, Q, K, and V may respectively denote a query matrix, a key matrix, and a value matrix that are input to the cross-attention model, and $d_k$ may be a dimension of a row vector of a key matrix.

The electronic device may obtain a fused image feature matrix $F'_{im}$ of each encoder by using the LN layer and the FFN layer, based on an output of the cross-attention model. According to an embodiment, the electronic device may obtain a fused image feature matrix by inputting an image feature matrix corresponding to each encoder and a face priori feature matrix to a multi-head attention layer and may rather well reflect a correlation between face image features since the fused image feature matrix obtained based on such a cross-attention mechanism integrates face priori feature information.

For ease of description, a feature position of an image feature matrix of an initial feature map corresponding to a feature of the initial feature map may be expressed by the feature position of the image feature matrix of the initial feature map.

For example, the operation of obtaining the updated image feature matrix of the current encoder by using a third network may include determining a normalization position of each feature of the fused image feature matrix of the current encoder, in which the normalization position is a normalization position of a feature in a feature map corresponding to each feature in the feature map; determining K normalization positions near the normalization position of each feature according to a preset rule in each feature map of the multi-level feature map; and obtaining a feature corresponding to each feature of the fused image feature matrix of the current encoder as a feature of the updated image feature matrix of the current encoder by performing weighted summation on L*K features corresponding to the K normalization positions of each feature map of the multi-level feature map in the fused image feature matrix of the current encoder. In this case, L is the number of feature maps of the multi-level feature map and may be, for example, L=4.

For example, the third network may include a transformable attention layer, a residual summation and LN layer (add & norm), and an FFN layer.

The example of obtaining a feature from an updated image feature matrix of an encoder by using the third network is described hereinafter.

For example, layer information and position information corresponding to each feature in a fused image feature matrix output by the first network may be inserted into and added to each feature according to Equation 5 below.

$$M_i^P = M_i + L_i + P_i \qquad \text{Equation 5}$$

In Equation 5, $M_i$ may be an ith feature in a fused image feature matrix, $L_i$ may be an initial feature map (that is, a partial level feature map of the multi-level feature map) corresponding to the ith feature, $P_i$ may be a position in the initial feature map of a feature corresponding to the ith feature in the initial feature map corresponding to the ith feature, and $$M_i^P$$

may be the ith feature to which layer information and position information are added.

For example, a spatial position $r_i \in [0,1]^2$ of each feature in the initial feature map may be represented by using normalized coordinates, and $r_i$ may be a normalized spatial position in the initial feature map corresponding to the ith feature in the fused image feature matrix. For example, (0,0) and (1,0) may respectively represent normalized spatial positions corresponding to an upper left end and an upper right end of the original feature map. Such normalized coordinates may be used as a reference point for relevant feature sampling.

For example, as to $M_i$ in the fused image feature matrix, the normalized coordinates of the initial feature map corresponding thereto may be $r_i$, and the electronic device may update $M_i$ to $$M_i'$$

by sampling a plurality of features around $r_i$. The normalized coordinates corresponding to multiple sampling features may be expressed by Equation 6 below.

$$p_{ik} = r_i + \delta_{ik} \qquad \text{Equation 6}$$

In Equation 6, $\delta_{ik}$ may be normalized coordinates corresponding to a sampled feature in the initial feature map, $$\delta_{ik} = FC(M_i^P),$$

$k=1, \ldots, K$, and K may be a preset value.

After determining the normalized coordinates corresponding to the multiple sampling features, the electronic device may determine a feature $x_{ik}$ corresponding to $p_{ik}$ and a fused image feature matrix based on the determined normalized coordinates and may determine $$M_i'$$

by using Equation 7 below.

$$M_i' = W_1 \sum_{k=1}^{K} \alpha_{ik}(W_2 x_{ik}) \qquad \text{Equation 7}$$

In Equation 7, $W_1$ and $W_2$ may be a trainable weight matrix, and $\alpha_{ik}$ may be obtained from Equation 8 or 9 below.

$$\alpha_{ik} = softmax(FC(M_i^P)) \qquad \text{Equation 8}$$

$$\alpha_{ik} = softmax(M_i^P x_{ik}) \qquad \text{Equation 9}$$

For example, the electronic device may determine a normalized position $r_{ci}$ of $M_{c0}$ in a second-level feature map for a partial feature $M_c$ of a fused image feature matrix corresponding to a feature $M_{c0}$ of the second-level feature map of a pyramid feature map and may determine K coordinates near $r_{ci}$, based on Equation 6. In this case, the K coordinates may correspond to K coordinates in the second-level feature map, and the K coordinates may correspond to K features in the fused image feature matrix. In other words, for the K features corresponding to the K coordinates in the fused image feature matrix, the electronic device may operate an updated feature $$M_c'$$

corresponding to $M_c$ by using Equation 7.

As described above, when operating $$M_i',$$

the electronic device may obtain $$M_i'$$

by sampling K features in a fused image feature matrix, only based on an initial feature map (e.g., the second-level feature map) corresponding to $M_i$.

For another example, the electronic device may sample K features in each level feature map for $M_i$ to integrate a multi-level image feature and may obtain $$M_i'$$

through Equation 10.

$$M_i' = W_1 \sum_{j=1}^{L} \sum_{k=1}^{K} \alpha_{ijk}(W_2 x_{ijk}) \qquad \text{Equation 10}$$

In Equation 10, L may be the number (e.g., L=4 when an extracted pyramid feature map is a four-level feature map) of multi-level feature maps, and $x_{ijk}$ may be a kth feature sampled in a fused image feature matrix based on a jth level feature map. Position coordinates corresponding to $x_{ijk}$ may be $r_i + \delta_{ijk}$. In this case, $\delta_{ijk}$ may be obtained through the linear projection of $$M_i^P$$

through Equation 11 below.

$$\delta_{ijk} = FC(M_i^P) \qquad \text{Equation 11}$$

For example, the electronic device may determine K coordinates of each level feature map through Equation 11 for a partial feature $M_c$ of a fused image feature matrix and may determine K features corresponding to the K coordinates of each level feature map of the fused image feature matrix. In this case, the electronic device may determine K*L features of the fused image feature matrix and may determine $$M'_c$$

updated based on Equation 10.

Figure 4:
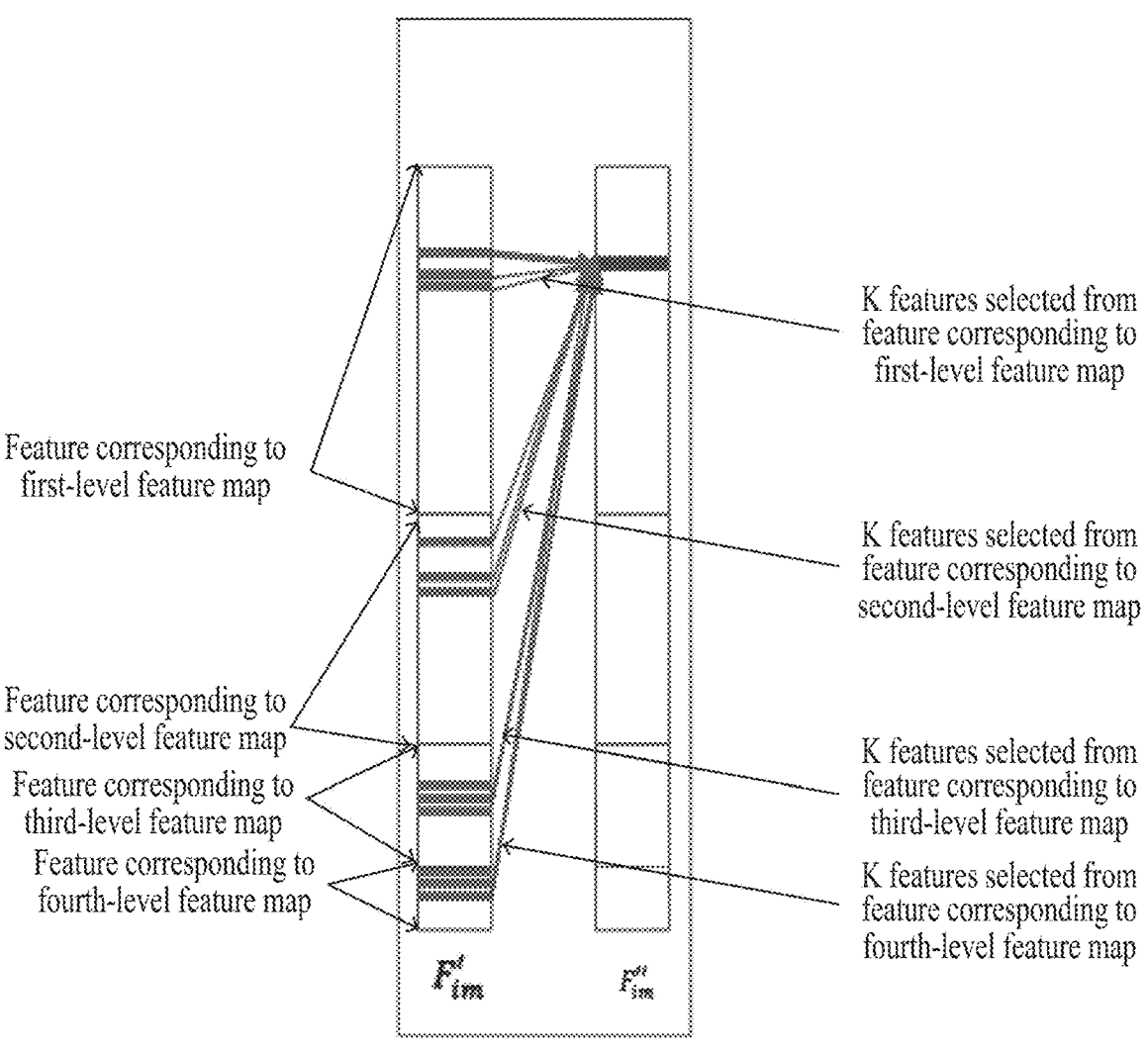
FIG. 4 illustrates an example operation of updating an image feature matrix based on a transformable attention mechanism according to one or more embodiments.

FIG. 4 illustrates an example operation of updating an image feature matrix based on a transformable attention mechanism according to one or more embodiments.

In the example of FIG. 4, an updated image feature matrix $$F''_{im}$$

is obtained by using a transformable attention mechanism, based on a fused image feature matrix $$F'_{im}.$$

Referring to FIG. 4, an electronic device (e.g., the electronic device 700 of FIG. 7) may update a feature corresponding to each level feature map of $$F'_{im}$$

by using a feature corresponding to a multi-level feature map of $$F'_{im}$$

and may obtain a feature corresponding to each feature map of a feature matrix $$F''_{im}$$

through the updated feature. FIG. 4 illustrates an example structure of a third network layer of an encoder.

For example, with respect to a partial feature of $$F'_{im},$$

the electronic device may obtain K features from a feature corresponding to a first-level feature map of $$F'_{im},$$

may obtain K features from a feature corresponding to a second-level feature map of $$F'_{im},$$

may obtain K features from a feature corresponding to a third-level feature map of $$F'_{im},$$

may obtain K features from a feature corresponding to a fourth-level feature map of $$F'_{im},$$

and may determine an updated feature of the partial feature to be a feature corresponding to the partial feature in $$F''_{im},$$

based on the obtained 4K features. Accordingly, the feature corresponding to the first-level feature map in $$F'_{im},$$

for example, may include information on each level feature map.

Each feature of $$F'_{im}$$

may integrate information on the feature corresponding to the multi-level feature map of $$F'_{im},$$

through which information corresponding to a feature map of a lower level may be further used, and thus a correlation between local features of a face image may be further reflected.

The method of sampling K features based on each feature map described herein is just an example and collecting K or L*K features in another method and updating a feature of a second image matrix may also be adopted without limit.

For example, a fused image feature matrix may be updated to an updated image feature matrix by sampling a feature of a partial feature map only.

For example, a second network of each encoder may further include a self-attention model, and in this case, an operation of obtaining an updated face priori feature matrix of a current encoder may include obtaining a self-attention face priori feature matrix corresponding to the current encoder by using the self-attention model, based on the face priori feature matrix corresponding to the current encoder; and an operation of obtaining the updated face priori feature matrix of the current encoder by using a first transformable attention model, based on the self-attention face priori feature matrix corresponding to the current encoder and a fused image feature matrix of the current encoder.

For example, the self-attention model may include a self-attention layer that is cascaded, an LN layer, and an FFN layer, and in this case, the operation of obtaining the self-attention face priori feature matrix of the current encoder may include an operation of obtaining the self-attention face priori feature matrix of the current encoder through a cascaded self-attention layer, the LN layer and the FFN layer by inputting the face priori feature matrix corresponding to the current encoder in which position information is embedded, the face priori feature matrix corresponding to the current encoder in which the position information is embedded, and the face priori feature matrix corresponding to the current encoder respectively as a query matrix, a key matrix, and a value matrix to the self-attention layer. In this case, the operation of obtaining the updated face priori feature matrix of the current encoder by using a second transformable attention model may include an operation of determining a normalization position of each feature of the self-attention face priori feature matrix of the current encoder in a final level feature map, in which the normalization position is a normalization position of a feature in the final level feature map corresponding to each feature in the final level feature map; an operation of determining K normalization positions near the normalization position in the final level feature map according to a preset rule; and an operation of determining K features corresponding to the K normalization positions in the updated image feature matrix of the current encoder and obtaining a feature corresponding to each feature of the self-attention face priori feature matrix as a feature of the updated face priori feature matrix of the current encoder by performing weighted summation on the K features.

Figure 5:
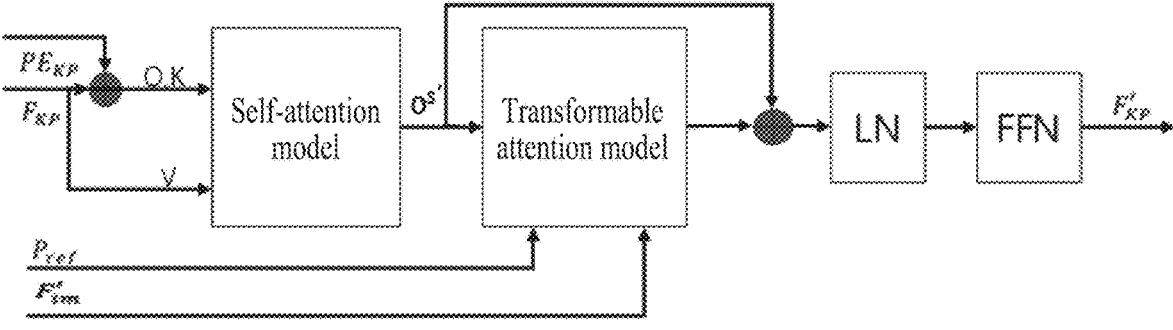
FIG. 5 illustrates an example structure of a second network layer according to one or more embodiments.

FIG. 5 illustrates an example structure of a second network of one of one or more encoders according to one or more embodiments.

Referring to FIG. 5, first, an electronic device (e.g., the electronic device 700 of FIG. 7) may obtain a self-attention face priori feature matrix $O^{S'}$ based on a self-attention model. In this case, the self-attention model may include a self-attention layer, an LN layer (Add & Norm), and an FFN layer. A query matrix, a key matrix, and a value matrix that are input to a self-attention layer may respectively be a face priori feature matrix corresponding to each encoder in which position information is embedded, a face priori feature matrix corresponding to each encoder in which position information is embedded, and a face priori feature matrix corresponding to each encoder. The electronic device may learn the dependency between face priori features when updating a face priori feature matrix based on a self-attention mechanism. Therefore, the self-attention face priori feature obtained based on the self-attention mechanism may reflect the structural information of the face priori features and may better express an input image.

A self-attention layer output $Q^S$ of the self-attention model may be expressed as Equation 12 below.

$$Q^S = \text{softmax}\left(\frac{QK^T}{\sqrt{d_k}}\right)V$$ Equation 12

In Equation 12, Q, K, and V may respectively denote the query matrix, the key matrix, and the value matrix that are input to the self-attention layer.

The electronic device may obtain $O^{S'}$ by using the LN layer (Add & Norm) and the FFN layer, based on $Q^S$.

Then, the electronic device may obtain an updated face priori feature matrix $$F'_{KP}$$

by using a transformable attention mechanism, based on $O^{S'}$.

Referring to FIG. 2, the transformable attention model may include a transformable attention layer, an LN layer, and an FFN layer.

Hereinafter, the example of an operation process on the updated face priori feature matrix $$F'_{KP}$$

is described.

For example, the electronic device may determine a normalization position of a feature of an initial feature map in the initial feature map (that is, a final level feature map) corresponding to a feature $f_{im}$ with respect to the feature $f_{im}$ of the self-attention face priori feature matrix. For example, (0,0) and (1,1) may each indicate a spatial position $r_{im}$ of a feature in the final level feature map of an upper left end and a lower right end of the final level feature map.

Then, the electronic device may determine K positions around $r_{im}$ according to Equation 13 below.
Equation 13:
In Equation 13, $\delta_{im\_k}$ is $$FC(f^P_{im}),$$

and $$f^P_{im}$$

may be a face priori feature of embedded position information corresponding to $f_{im}$.

The electronic device may determine features corresponding to the K positions in a fused image feature matrix. For example, features respectively corresponding to normalization positions in the final level feature map in the fused image feature matrix, and K features of the fused image feature matrix, may be determined based on K normalization positions.

Then, $f_{im}$ may be a feature corresponding to $f_{im}$ of the updated face priori feature matrix, based on K features according to Equation 14 below, and may be updated to $$F'_{im}.$$

$$f'_{im} = \sum_{k=1}^{K} \beta_k (Wf_{im\_k})$$ Equation 14

In Equation 14, W denotes a trainable weight matrix, and $$\beta_k = softmax(FC(f_{im}^P))$$

or $$\beta_k = softmax(f_{im}^P f_{im\_k}).$$

FIG. 6 illustrates an example method of obtaining a super-resolution image of a face image and/or key point coordinates of the face image by an electronic device according to one or more embodiments.

Referring to FIG. 6, cascaded T encoders may obtain an updated image feature matrix of a final encoder and/or an updated face priori feature matrix. An electronic device (e.g., the electronic device 700 of FIG. 7) may obtain a super-resolution image of the face image by obtaining a first offset through an up-sampling network and/or may obtain the key point coordinates of the face image predicted by obtaining a second offset through a key point prediction network.

For example, the electronic device may cut out a feature corresponding to a first-level feature map in the updated image feature matrix of the final encoder and may obtain an offset $I_{off}$ between a super-resolution image $I_{SR}$ and an LR image $I_{LR}$ (that is, an input image) by up-sampling or amplifying the feature corresponding to the first-level feature map through a convolution layer and a pixel shuffle layer. The electronic device may obtain a super-resolution image based on Equation 15 below.

$$I_{SR} = I_{LR} + I_{off} \qquad \text{Equation 15}$$

For example, the electronic device may obtain an offset $P_{off}$ between key point coordinates of an initial face image and the key point coordinates of the face image predicted through a multi-layer perceptron (MLP) based on Equation 16 below.

$$P_{off} = M(F'_{KP}) \qquad \text{Equation 16}$$

In Equation 16, $$F'_{KP}$$

denotes a face priori feature matrix of the final encoder.

For example, the electronic device may obtain $P_{off}$ by using a 3-layer fully connected network including a rectified linear unit (ReLU) activation function. In this case, the first two layers may be linearly fully connected in which the ReLU activation function is connected, and the last layer may directly output $P_{off}$ through full connection.

After obtaining $P_{off}$, predicted key point coordinates of the face image may be obtained according to Equation 17 below.

$$P_{KP} = \sigma(P_{off} + \sigma^{-1}(P_{ref})) \qquad \text{Equation 17}$$

In Equation 17, $\sigma$ and $\sigma$ may be a function, and $P_{ref}$ may be initial key point coordinates of the face image.

For example, a total model used to obtain a super-resolution image and/or the predicted key point coordinates of the face image may be trained by using a loss function for FSR together with a loss function for face marking.

For example, a loss of the FSR may include a pixel loss, an adversarial loss, and a perceptual loss, and a loss of the face marking may include a consistency loss and a separation constraint.

The FSR may restore a low-resolution face image to a high-resolution face image, and an FSR network may be trained to obtain a high-resolution ground truth image corresponding to a low-resolution training image by inputting the low-resolution training image to the FSR network. By doing so, without additional face priori information, FSR performance may be effectively improved by decreasing the complexity of the FSR network.

The face image processing method in the electronic device according to an embodiment of the present disclosure is described with reference to FIGS. 1 through 6. Hereinafter, the electronic device for processing the face image, according to an embodiment of the present disclosure, is described with reference to FIG. 7.

Figure 7:
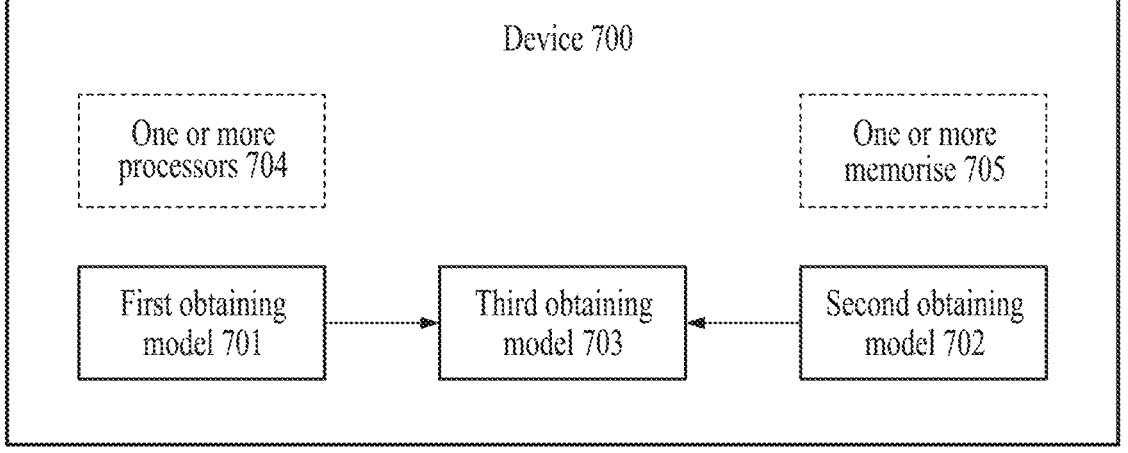
FIG. 7 illustrates an example electronic device with image processing according to one or more embodiments.

FIG. 7 illustrates an example electronic device with image processing according to one or more embodiments.

Referring to FIG. 7, an electronic device 700 for processing a face image may include a first obtaining model 701, a second obtaining model 702, and a third obtaining model 703. The electronic device 700 may further include one or more processors 704 and one or more memories 705. The one or more processors 704 may be configured to execute instructions and the one or more memories 705 may store the instructions and image data, such that the execution of the instructions by the one or more processors 704 may configure the one or more processors 704 to operate the first obtaining model 701, the second obtaining model 702, and the third obtaining model 703. However, the electronic device 700 is not limited to the foregoing examples and may further include other components, and one or more components of the electronic device 700 may be divided or combined.

For example, the first obtaining model 701 may obtain an initial image feature matrix of the face image, based on a multi-level feature map of the face image.

For example, the second obtaining model 702 may obtain an initial face priori feature matrix of the face image, based on a final level feature map of the multi-level feature map.

For example, the third obtaining model 703 may obtain a super-resolution image of the face image and/or key point coordinates of the face image by using one or more encoders cascaded based on the initial image feature matrix and the initial face priori feature matrix.

For example, the third obtaining model 703 may obtain a fused image feature matrix, based on the initial image feature matrix and the initial face priori feature matrix, by using a cross-attention model included in the one or more encoders, may obtain an updated image feature matrix of the face image, based on the fused image feature matrix, by using a first transformable attention model included in the one or more encoders, and may obtain the super-resolution image of the face image, based on the face image and the updated image feature matrix.

For example, the third obtaining model 703 may obtain the fused image feature matrix, based on the initial image feature matrix and the initial face priori feature matrix, by using the cross-attention model included in the one or more encoders, may obtain the updated face priori feature of the face image, based on the fused image feature matrix and the initial face priori feature matrix, by using a second transformable attention model included in the one or more encoders, and may predict the key point coordinates of the face image, based on the updated face priori feature and initial key point coordinates of the face image. In this case, the initial key point coordinates of the face image may be obtained based on the initial face priori feature matrix.

For example, the one or more encoders each may include a first network, a second network, and a third network, in which the first network may include the cross-attention model, the second network may include the first transformable attention model, and the third network may include the second transformable attention model.

For example, the third obtaining model 703, for each encoder, may obtain a fused image feature matrix of a current encoder by using the first network, based on an image feature matrix corresponding to the current encoder and the face priori feature matrix, may obtain an updated face priori feature matrix of the current encoder by using the second network, based on the fused image feature matrix of the current encoder and the face priori feature matrix corresponding to the current encoder, and may obtain an updated image feature matrix of the current encoder by using the third network, based on the fused image feature matrix of the current encoder. The third obtaining model 703 may obtain the super-resolution face image based on the face image and an updated image feature matrix of a final encoder among the one or more encoders and/or may predict the key point coordinates of the face image, based on an updated face priori feature matrix of the final encoder and the initial key point coordinates of the face image. In this case, when the current encoder is a first encoder among the one or more encoders, the image feature matrix corresponding to the current encoder may be the initial image feature matrix, and the face priori feature matrix corresponding to the current encoder may be the initial face priori feature matrix. When the current encoder is not the first encoder, the image feature matrix corresponding to the current encoder may be an updated image feature matrix of a previous encoder of the current encoder, and the face priori feature matrix corresponding to the current encoder may be an updated face priori feature matrix of the previous encoder of the current encoder.

For example, the third obtaining model 703, based on an updated image feature matrix corresponding to the final encoder that is cascaded, obtaining a first offset by using an up-sampling amplification network and obtaining a super-resolution image based on the face image and the first offset and/or, based on an updated face priori feature matrix corresponding to the final encoder that is cascaded, may obtain a second offset by using a key point prediction network and obtaining the key point coordinates of the face image predicted based on the initial key point coordinates of the face image and the second offset. In this case, the initial key point coordinates of the face image may be obtained by fully connecting the initial face priori feature matrix.

For example, the first network of each encoder may further include an LN layer and an FFN layer.

For example, the third obtaining model 703 may obtain the fused image feature matrix of the current encoder through a cascaded cross-attention model, the LN layer, and the FFN layer by inputting the image feature matrix corresponding to the current encoder in which position information is embedded, the face priori feature matrix corresponding to the current encoder in which the position information is embedded, and the face priori feature matrix corresponding to the current encoder respectively as a query vector, a key vector, and a value vector to a cross-attention model.

For example, the third obtaining model 703 may determine a normalization position of each feature of the fused image feature matrix of the current encoder, in which the normalization position is a normalization position of a feature in a feature map corresponding to each feature in the feature map, may determine K normalization positions near the normalization position of each feature according to a preset rule in each feature map of the multi-level feature map, and may obtain a feature corresponding to each feature of the fused image feature matrix of the current encoder as a feature of the updated image feature matrix of the current encoder by performing weighted summation on L*K features corresponding to the K normalization positions of each feature map of the multi-level feature map in the fused image feature matrix of the current encoder. In this case, L may be the number of feature maps of the multi-level feature map.

For example, a second network of each encoder may further include a self-attention model, and in this case, the third obtaining model 703 may obtain a self-attention face priori feature matrix corresponding to the current encoder by using the self-attention model, based on the face priori feature matrix corresponding to the current encoder and may obtain the updated face priori feature matrix of the current encoder by using the first transformable attention model, based on the self-attention face priori feature matrix corresponding to the current encoder and the fused image feature matrix of the current encoder.

For example, the self-attention model may include a cascaded self-attention layer, an LN layer, and an FFN layer. For example, the third obtaining model 703 may obtain the self-attention face priori feature matrix of the current encoder through the cascaded self-attention layer, the LN layer and the FFN layer by inputting the face priori feature matrix corresponding to the current encoder in which the position information is embedded, the face priori feature matrix corresponding to the current encoder in which the position information is embedded, and the face priori feature matrix corresponding to the current encoder respectively as a query vector, a key vector, and a value vector to a self-attention layer, may determine a normalization position of each position of the self-attention face priori feature matrix of the current encoder in the final level feature map, in which the normalization position is a normalization position of a feature in a final level feature map corresponding to each feature in the final level feature map, may determine K normalization positions near the normalization position in the final level feature map according to a preset rule, and may determine K features corresponding to the K normalization positions in the updated image feature matrix of the current encoder and obtain a feature corresponding to each feature of the self-attention face priori feature matrix as a feature of the updated face priori feature matrix of the current encoder by performing weighted summation on the K features.

According to an embodiment, the electronic device is provided, in which the electronic device may include a processor and a memory storing a computer program, and the computer program, when executed by the processor, may implement a face image processing method.

The one or more memories may include computer-readable instructions. The processor may perform the above-described operations when the instructions stored in the memory are executed in the processor. The memory may be a volatile memory or a non-volatile memory.

The one or more processors may be a device for executing instructions or programs for controlling the electronic device 700 and may include, for example, a central processing unit (CPU), a graphics processing unit (GPU), and a neural processing unit (NPU), but examples are not limited thereto.

In addition, the electronic device 700 may process the operations described above.

The processors, memories, electronic devices, cameras, and other apparatuses, devices, models, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method, comprising:
generating an initial image feature matrix of a face image based on a multi-level feature map of the face image;
generating an initial face priori feature matrix of the face image based on a final level feature map of the multi-level feature map; and
generating a super-resolution image of the face image and/or key point coordinates of the face image by using one or more encoders, based on the initial image feature matrix and the initial face priori feature matrix as input to the one or more encoders.

2. The method of claim 1, wherein each of the one or more encoders includes a cross-attention model and a first transformable attention model, wherein the super-resolution image is obtained, and the obtaining of the super-resolution image comprises:
obtaining a fused image feature matrix, based on the initial image feature matrix and the initial face priori feature matrix, by using the cross-attention model of an initial encoder of the one or more encoders;
obtaining an updated image feature matrix of the face image, based on the fused image feature matrix, by using the first transformable attention model of the initial encoder; and
obtaining the super-resolution image of the face image, based on the face image and the updated image feature matrix.

3. The method of claim 1, wherein each of the one or more encoders includes a cross-attention model and a second transformable attention model, and wherein the key point coordinates are obtained, and the obtaining of the key point coordinates of the face image comprises:
obtaining a fused image feature matrix, based on the initial image feature matrix and the initial face priori feature matrix, by using the cross-attention model of an initial encoder of the one or more encoders;
obtaining an updated face priori feature of the face image, based on the fused image feature matrix and the initial face priori feature matrix, by using the second transformable attention model of the initial encoder; and
predicting the key point coordinates of the face image, based on the updated face priori feature and initial key point coordinates of the face image, wherein the initial key point coordinates of the face image are obtained based on the initial face priori feature matrix.

4. The method of claim 1, wherein
the one or more encoders each comprise a first network, a second network, and a third network, wherein the first network comprises a cross-attention model, the second network comprises a first transformable attention model, and the third network comprises a second transformable attention model, and
the obtaining of the super-resolution image of the face image and/or the key point coordinates of the face image comprises:
when the obtaining of the super-resolution image is performed, obtaining a fused image feature matrix of a current encoder by using the first network, based on an image feature matrix corresponding to the current encoder and a face priori feature matrix corresponding to the current encoder, for each of the one or more encoders,
obtaining an updated face priori feature matrix of the current encoder by using the second network, based on the fused image feature matrix of the current encoder and the face priori feature matrix corresponding to the current encoder, for each of plural encoders when the one or more encoders include the plural encoders, or the plural encoders and an additional encoder,
obtaining an updated image feature matrix of the current encoder by using the third network, based on the fused image feature matrix of the current encoder, for each of the one or more encoders, and
obtaining the super-resolution face image based on the face image and an updated image feature matrix of a final encoder among the one or more encoders; and
when the obtaining of the key point coordinates is performed, predicting the key point coordinates of the face image, based on an updated face priori feature matrix of the final encoder and initial key point coordinates of the face image, wherein the initial key point coordinates of the face image are obtained based on the initial face priori feature matrix,
wherein, when the current encoder is an initial encoder among the one or more encoders, the image feature matrix corresponding to the current encoder is the initial image feature matrix, and the face priori feature matrix corresponding to the current encoder is the initial face priori feature matrix, and,
wherein, when the current encoder is not the initial encoder, the image feature matrix corresponding to the current encoder is an updated image feature matrix of a previous encoder of the current encoder, and the face priori feature matrix corresponding to the current encoder is an updated face priori feature matrix of the previous encoder of the current encoder.

5. The method of claim 4, wherein the obtaining of the super-resolution image of the face image and/or the key point coordinates of the face image comprises:
based on an updated image feature matrix corresponding to the final encoder, obtaining a first offset by using an up-sampling amplification network and obtaining the super-resolution image based on the face image and the first offset; and/or
based on an updated face priori feature matrix corresponding to the final encoder, obtaining a second offset by using a key point prediction network and obtaining the key point coordinates of the face image predicted based on the initial key point coordinates of the face image and the second offset.

6. The method of claim 4, wherein the first network of each of the one or more encoders further comprises a layer normalization model and a feedforward network model, and the obtaining of the fused image feature matrix of the current encoder comprises:

obtaining the fused image feature matrix of the current encoder through a cascaded cross-attention model, the layer normalization model, and the feedforward network model by inputting the image feature matrix corresponding to the current encoder in which position information is embedded, the face priori feature matrix corresponding to the current encoder in which the position information is embedded, and the face priori feature matrix corresponding to the current encoder respectively as a query vector, a key vector, and a value vector to a cross-attention model.

7. The method of claim 4, wherein the obtaining of the updated image feature matrix of the current encoder by using the third network, based on the fused image feature matrix of the current encoder, comprises:

determining a normalization position of each feature of the fused image feature matrix of the current encoder, wherein the normalization position is a normalization position of a feature in a feature map corresponding to each feature in the feature map;

determining K normalization positions near the normalization position of each feature according to a preset rule in each feature map of the multi-level feature map; and obtaining a feature corresponding to each feature of the fused image feature matrix of the current encoder as a feature of the updated image feature matrix of the current encoder by performing weighted summation on L*K features corresponding to the K normalization positions of each feature map of the multi-level feature map in the fused image feature matrix of the current encoder.

8. The method of claim 4, wherein the second network of each of the one or more encoders further comprises a self-attention model, and the obtaining of the updated face priori feature matrix of the current encoder comprises:

obtaining a self-attention face priori feature matrix corresponding to the current encoder by using the self-attention model, based on the face priori feature matrix corresponding to the current encoder; and obtaining the updated face priori feature matrix of the current encoder by using the first transformable attention model, based on the self-attention face priori feature matrix corresponding to the current encoder and the fused image feature matrix of the current encoder.

9. The method of claim 8, wherein the self-attention model comprises a self-attention layer that is cascaded, a layer normalization layer, and a feedforward network layer, and the obtaining of the self-attention face priori feature matrix of the current encoder comprises:

obtaining the self-attention face priori feature matrix of the current encoder through the self-attention layer, the layer normalization layer, and the feedforward network layer by inputting the face priori feature matrix corresponding to the current encoder in which the position information is embedded, the face priori feature matrix corresponding to the current encoder in which the position information is embedded, and the face priori feature matrix corresponding to the current encoder respectively as a query vector, a key vector, and a value vector to the self-attention model, wherein the obtaining of the updated face priori feature matrix of the current encoder by using the second transformable attention model comprises:

determining a normalization position of each position of the self-attention face priori feature matrix of the current encoder in the final level feature map, wherein the normalization position is a normalization position of a feature in a final level feature map corresponding to each feature in the final level feature map;

determining K normalization positions near the normalization position in the final level feature map according to a preset rule; and determining K features corresponding to the K normalization positions in the updated image feature matrix of the current encoder and obtaining a feature corresponding to each feature of the self-attention face priori feature matrix as a feature of the updated face priori feature matrix of the current encoder by performing weighted summation on the K features.

10. The method of claim 1, wherein the initial face priori feature matrix is generated prior to encoding operations, wherein the one or more encoders output the generated super-resolution image of the face image and/or the key point coordinates of the face image, and wherein the one or more encoders comprise a plurality of cascaded encoders.

11. A non-transitory computer-readable storage medium storing instructions that, when executed by one or more processors, cause the one or more processors to perform the method of claim 1.

12. An electronic device comprising:

one or more processors; and a memory configured to store instructions, wherein, when the instructions are executed by the one or more processors, the one or more processors are configured to:

generate an initial image feature matrix of a face image based on a multi-level feature map of the face image;

generate an initial face priori feature matrix of the face image based on a final level feature map of the multi-level feature map; and generate a super-resolution image of the face image and/or key point coordinates of the face image, by using one or more encoders, based on the initial image feature matrix and the initial face priori feature matrix as input to the one or more encoders.

13. The electronic device of claim 12, wherein each of the one or more encoders includes a cross-attention model and a first transformable attention model, wherein the super-resolution image is obtained, and the one or more processors further configured to:

obtain a fused image feature matrix, based on the initial image feature matrix and the initial face priori feature matrix, by using the cross-attention model of an initial encoder of the one or more encoders;

obtain an updated image feature matrix of the face image, based on the fused image feature matrix, by using the first transformable attention model of the initial encoder; and obtain the super-resolution image of the face image, based on the face image and the updated image feature matrix.

14. The electronic device of claim 12, wherein each of the one or more encoders includes a cross-attention model and a second transformable attention model, wherein the key point coordinates are obtained, and the one or more processors further configured to:

obtain a fused image feature matrix, based on the initial image feature matrix and the initial face priori feature matrix, by using the cross-attention model of an initial encoder of the one or more encoders;

obtain an updated face priori feature of the face image, based on the fused image feature matrix and the initial face priori feature matrix, by using the second transformable attention model of the initial encoder; and predict the key point coordinates of the face image, based on the updated face priori feature and initial key point coordinates of the face image, wherein the initial key point coordinates of the face image are obtained based on the initial face priori feature matrix.

15. The electronic device of claim 12, wherein the one or more encoders each comprise a first network, a second network, and a third network, wherein the first network comprises a cross-attention model, the second network comprises a first transformable attention model, and the third network comprises a second transformable attention model, and the one or more processors further configured to:

when the obtaining of the super-resolution image is performed, obtain a fused image feature matrix of a current encoder by using the first network, based on an image feature matrix corresponding to the current encoder and a face priori feature matrix corresponding to the current encoder, for each of one or more encoders, obtain an updated face priori feature matrix of the current encoder by using the second network, based on the fused image feature matrix of the current encoder and the face priori feature matrix corresponding to the current encoder, for each of the one or more encoders, obtain an updated image feature matrix of the current encoder by using the third network, based on the fused image feature matrix of the current encoder, for each of the one or more encoders, and obtain the super-resolution face image based on the face image and an updated image feature matrix of a final encoder among the one or more encoders; and when the obtaining of the skey point coordinates is performed, predict the key point coordinates of the face image, based on an updated face priori feature matrix of the final encoder and initial key point coordinates of the face image, wherein the initial key point coordinates of the face image are obtained based on the initial face priori feature matrix, wherein, when the current encoder is an initial encoder among the one or more encoders, the image feature matrix corresponding to the current encoder is the initial image feature matrix, and the face priori feature matrix corresponding to the current encoder is the initial face priori feature matrix, and, wherein, when the current encoder is not the initial encoder, the image feature matrix corresponding to the current encoder is an updated image feature matrix of a previous encoder of the current encoder, and the face priori feature matrix corresponding to the current encoder is an updated face priori feature matrix of the previous encoder of the current encoder.

16. The electronic device of claim 15, wherein the one or more processors are further configured to:

based on an updated image feature matrix corresponding to the final encoder, obtain a first offset by using an up-sampling amplification network and obtaining a super-resolution image based on the face image and the first offset; and/or based on an updated face priori feature matrix corresponding to the final encoder, obtain a second offset by using a key point prediction network and obtaining the key point coordinates of the face image predicted based on the initial key point coordinates of the face image and the second offset.

17. The electronic device of claim 15, wherein the first network of each of one or more encoders further comprises a layer normalization model and a feedforward network model, and the one or more processors further configured to:

obtain the fused image feature matrix of the current encoder through a cascaded cross-attention model, the layer normalization model, and the feedforward network model by inputting the image feature matrix corresponding to the current encoder in which position information is embedded, the face priori feature matrix corresponding to the current encoder in which the position information is embedded, and the face priori feature matrix corresponding to the current encoder respectively as a query vector, a key vector, and a value vector to a cross-attention model.

18. The electronic device of claim 15, wherein the one or more processors are further configured to:

determine a normalization position of each feature of the fused image feature matrix of the current encoder, wherein the normalization position is a normalization position of a feature in a feature map corresponding to each feature in the feature map;

determine K normalization positions near the normalization position of each feature according to a preset rule in each feature map of the multi-level feature map; and obtain a feature corresponding to each feature of the fused image feature matrix of the current encoder as a feature of the updated image feature matrix of the current encoder by performing weighted summation on L*K features corresponding to the K normalization positions of each feature map of the multi-level feature map in the fused image feature matrix of the current encoder.

19. The electronic device of claim 15, wherein the second network of each of the one or more encoders further comprises a self-attention model, and the third obtaining model further configured to:

obtain a self-attention face priori feature matrix corresponding to the current encoder by using the self-attention model, based on the face priori feature matrix corresponding to the current encoder; and obtain the updated face priori feature matrix of the current encoder by using the first transformable attention model, based on the self-attention face priori feature matrix corresponding to the current encoder and the fused image feature matrix of the current encoder.

20. The electronic device of claim 19, wherein the self-attention model comprises a self-attention layer that is cascaded, a layer normalization layer, and a feedforward network layer, and the one or more processors further configured to:

obtain the self-attention face priori feature matrix of the current encoder through the self-attention layer, the layer normalization layer, and the feedforward network layer by inputting the face priori feature matrix corresponding to the current encoder in which the position information is embedded, the face priori feature matrix corresponding to the current encoder in which the position information is embedded, and the face priori feature matrix corresponding to the current encoder respectively as a query vector, a key vector, and a value vector to the self-attention model;

determine a normalization position of each position of the self-attention face priori feature matrix of the current encoder in the final level feature map, wherein the normalization position is a normalization position of a feature in a final level feature map corresponding to each feature in the final level feature map;

determine K normalization positions near the normalization position in the final level feature map according to a preset rule; and determine K features corresponding to the K normalization positions in the updated image feature matrix of the current encoder and obtaining a feature corresponding to each feature of the self-attention face priori feature matrix as a feature of the updated face priori feature matrix of the current encoder by performing weighted summation on the K features.

\* \* \* \* \*